Figure 1:
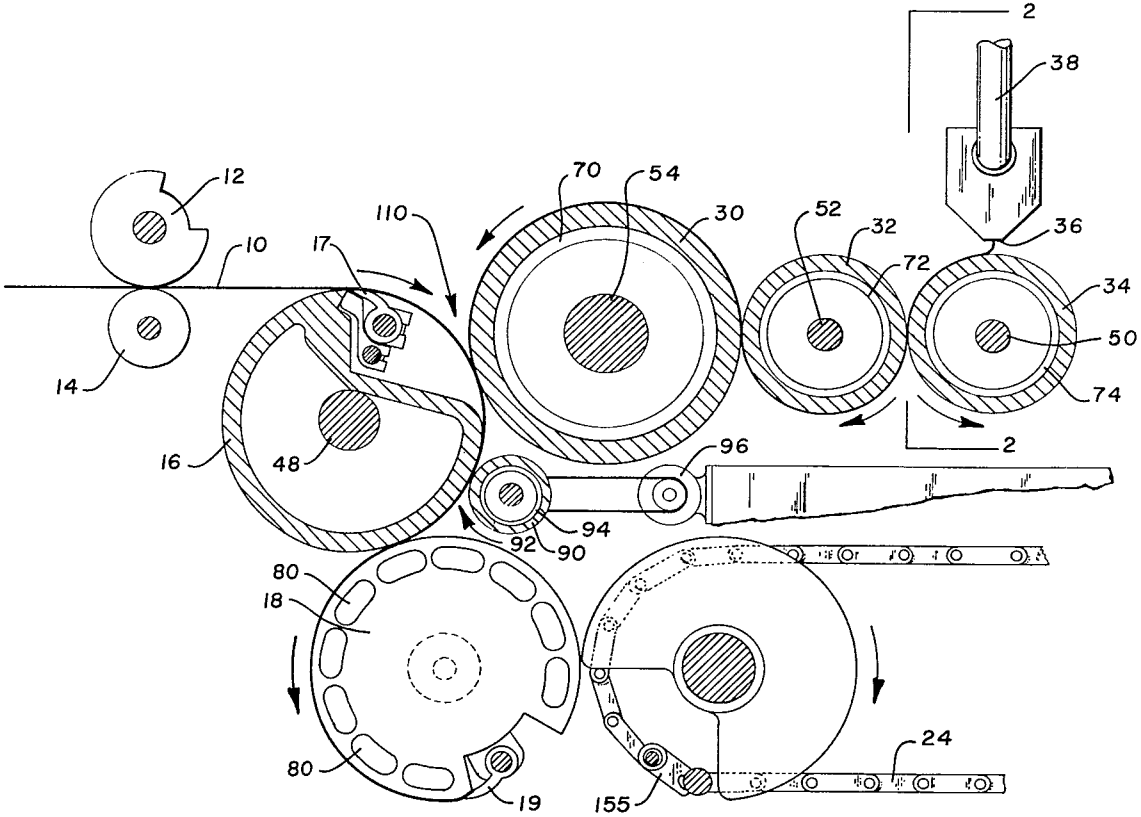
Figure 2:
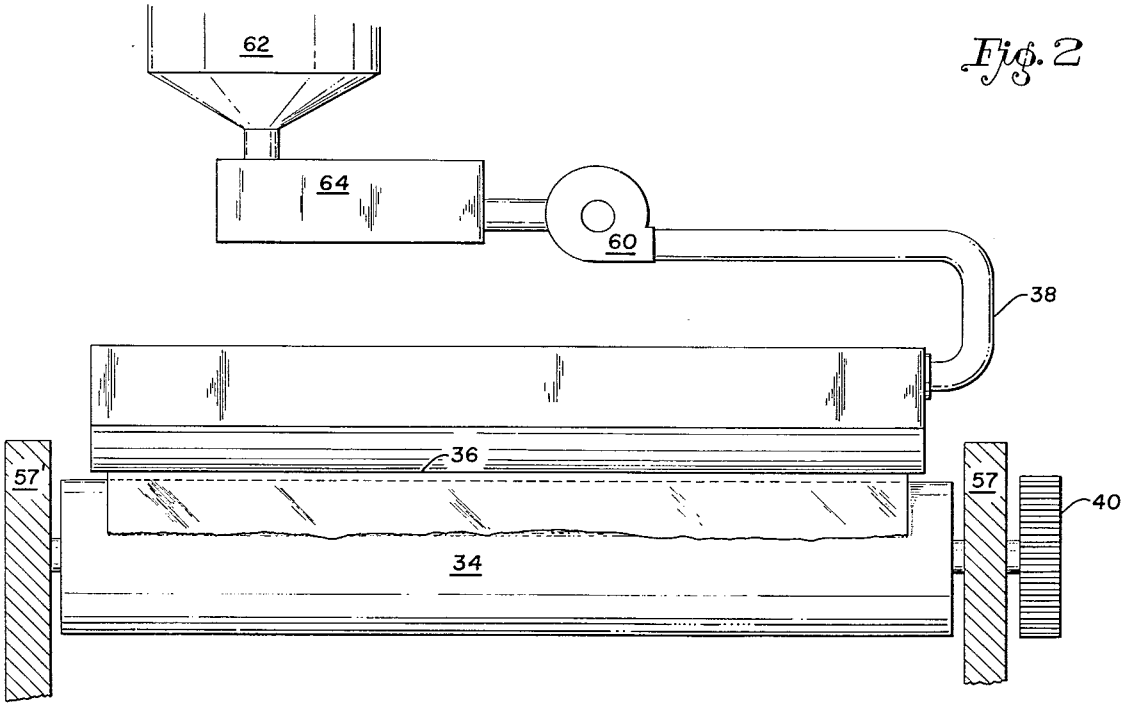
Figure 4:
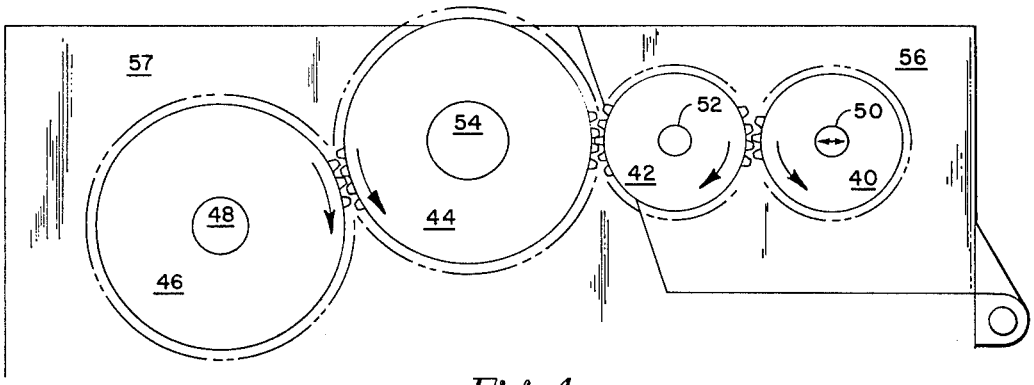
Figure 3:
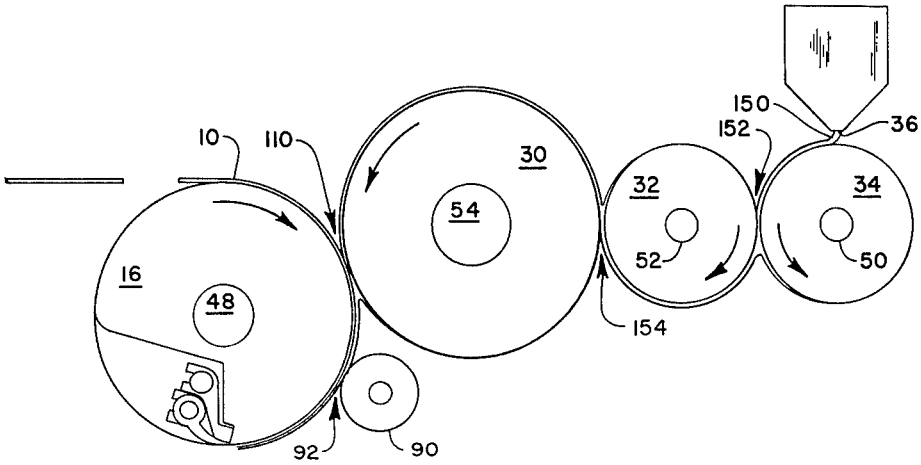

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED DECEMBER 2, 1975

941 O.G. 8

T941,013

COATING MACHINE AND METHOD

James E. Huffaker, 1117 Radcliffe Drive 37664, and Ted L. Douglas, Rte. 11 37663, both of Kingsport, Tenn.

Continuation of abandoned application Ser. No. 265,071, June 21, 1972. This application Sept. 3. 1974, Ser. No. 502,574

Int. Cl. B05c *1/02*

U.S. Cl. 118—60

3 Sheets Drawing. 10 Pages Specification

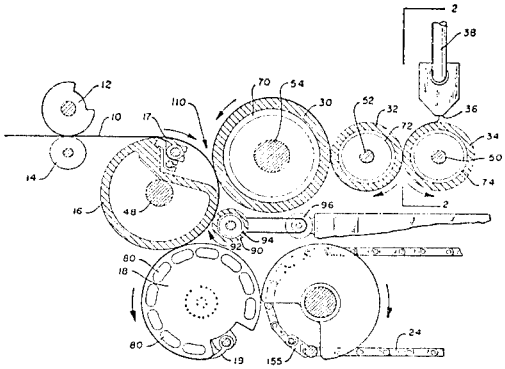

Improved apparatus and method for the application of thin coatings of thermoplastic material to sheets of material being advanced in succession. Sheets are carried by impression roll 16, post applicator roll 30, heated smoothing means 90, to cooling roll 18. Molten material is supplied from nozzle 36 to roll 34 which feeds the material to applicator 30.